US008352869B2

(12) United States Patent
Melcher et al.

(10) Patent No.: US 8,352,869 B2
(45) Date of Patent: *Jan. 8, 2013

(54) SYSTEMS AND METHODS FOR PROVIDING MULTI-DIRECTIONAL VISUAL BROWSING ON AN ELECTRONIC DEVICE

(75) Inventors: Ryan Melcher, Ben Lomond, CA (US); Dane Howard, Los Gatos, CA (US)

(73) Assignee: eBay Inc., San Jose, CA (US)

( * ) Notice: Subject to any disclaimer, the term of this patent is extended or adjusted under 35 U.S.C. 154(b) by 269 days.

This patent is subject to a terminal disclaimer.

(21) Appl. No.: 12/712,167

(22) Filed: Feb. 24, 2010

(65) Prior Publication Data

US 2010/0218116 A1     Aug. 26, 2010

Related U.S. Application Data

(60) Provisional application No. 61/155,104, filed on Feb. 24, 2009.

(51) Int. Cl.
    *G06F 3/14* (2006.01)
    *G06F 3/17* (2006.01)
(52) U.S. Cl. ............ 715/747; 715/764; 345/173; 705/2; 707/3; 707/5; 707/705
(58) Field of Classification Search .......... 715/200–277, 715/700–867; 700/701–866; 709/201–229; 705/50–79; 345/30–111, 173; 348/206–231.9; 707/200–206, 3, 5, 705
See application file for complete search history.

(56) References Cited

U.S. PATENT DOCUMENTS

| 6,366,299 | B1 | 4/2002 | Lanning et al. |
| 7,366,723 | B2 | 4/2008 | Shaburov |
| 7,555,496 | B1 | 6/2009 | Lantrip et al. |
| 7,774,326 | B2 * | 8/2010 | Arrouye et al. ............ 707/705 |
| 8,166,023 | B2 | 4/2012 | Melcher et al. |
| 2006/0036577 | A1 | 2/2006 | Knighton et al. |
| 2006/0059440 | A1 | 3/2006 | Pry |
| 2006/0179039 | A1 | 8/2006 | Murarka et al. |
| 2007/0033177 | A1 | 2/2007 | Friedman |
| 2007/0192345 | A1 | 8/2007 | Finley et al. |
| 2007/0276801 | A1 * | 11/2007 | Lawrence et al. ............ 707/3 |
| 2008/0004904 | A1 * | 1/2008 | Tran .................... 705/2 |

(Continued)

FOREIGN PATENT DOCUMENTS

AU     2011101048 A4     9/2011

(Continued)

OTHER PUBLICATIONS

"International Application Serial No. PCT/US2010/025291, Written Opinion mailed Apr. 14, 2010", 9 pgs.

(Continued)

*Primary Examiner* — Ruay Ho
(74) *Attorney, Agent, or Firm* — Schwegman, Lundberg & Woessner, P.A.

(57) ABSTRACT

Systems and methods for multi-directional visual browsing on an electronic device are described. In example embodiments, a primary result and a peripheral result associated with a user of a device are determined. A display layout based on attributes associated with the primary result and the peripheral result is generated. The display layout is then rendered and displayed on the device.

20 Claims, 8 Drawing Sheets

U.S. PATENT DOCUMENTS

| | | | |
|---|---|---|---|
| 2008/0244429 A1* | 10/2008 | Stading | 715/764 |
| 2009/0102805 A1* | 4/2009 | Meijer et al. | 345/173 |
| 2009/0187558 A1* | 7/2009 | McDonald | 707/5 |
| 2010/0217760 A1 | 8/2010 | Melcher | |

FOREIGN PATENT DOCUMENTS

| | | |
|---|---|---|
| CN | 102334154 A | 1/2012 |
| WO | WO-2010099246 A1 | 9/2010 |

OTHER PUBLICATIONS

"International Application Serial No. PCT/US2010/025291, Search Report mailed Apr. 14, 2010", 6 pgs.

"U.S. Appl. No. 12/712,163, Notice of Allowance mailed Feb. 22, 2012", 9 pgs.

"U.S. Appl. No. 12/712,163, Response to Rule 312 Communication mailed Mar. 20, 2012", 2 pgs.

"European Application Serial No. 10746800.1, Office Action Response filed Feb. 16, 2012", 13 pgs.

"U.S. Appl. No. 12/712,163 Notice of Allowance, Mailed Dec. 5, 2011", 10 pgs.

"Australian Application Serial No. 2010218060, First Examiner Report mailed Sep. 8, 2011", 2 pgs.

"International Application Serial No. PCT/US2010/025291, International Preliminary Report on Patentability mailed Sep. 9, 2011", 8 pgs.

\* cited by examiner

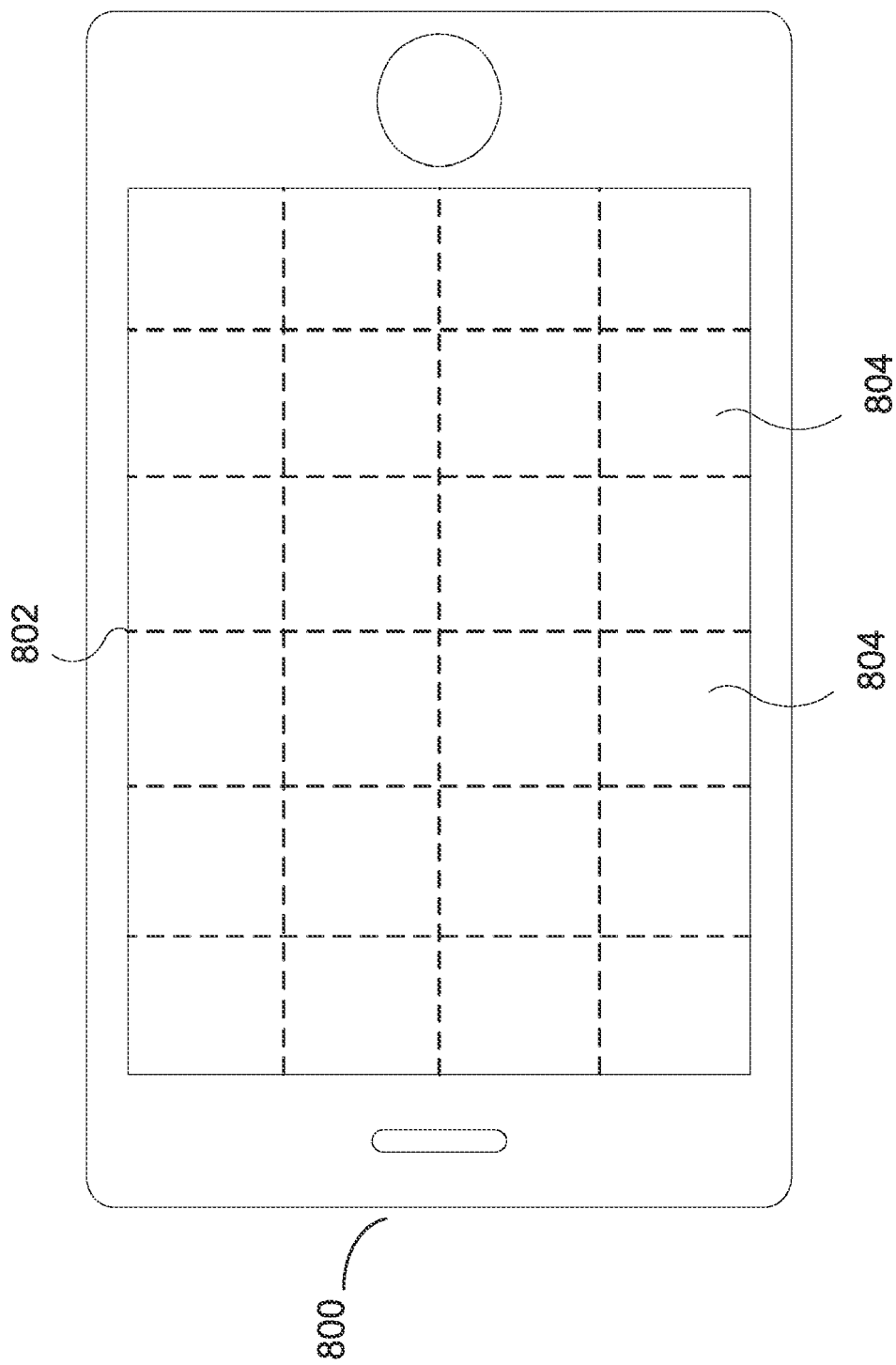

SYSTEMS AND METHODS FOR PROVIDING MULTI-DIRECTIONAL VISUAL BROWSING ON AN ELECTRONIC DEVICE

RELATED APPLICATIONS

The present application claims the priority benefit of U.S. Provisional Patent Application No. 61/155,104, filed Feb. 24, 2009 and entitled "Systems and Methods for Multi-Direction Visual Browsing on an Electronic Device." The content of the aforementioned application is incorporated herein by reference.

FIELD

The present disclosure relates generally to information display, and in a specific example embodiment, to multi-directional visual browsing on an electronic device.

BACKGROUND

The ubiquitous presence of networked computers and mobile devices, and the growing use of databases, web logs, and email have resulted in the accumulation of vast quantities of information. Many users now have access to this information via search engines and a bewildering array of web sites. Processing this information in a manner that is user-friendly and efficient creates a number of challenges and complexities.

BRIEF DESCRIPTION OF DRAWINGS

Various ones of the appended drawings merely illustrate example embodiments of the present invention and cannot be considered as limiting its scope.

FIG. 8 is an example of an electronic device capable of illustrating a multi-directional visual browser according to an example embodiment.

DETAILED DESCRIPTION

Figure 1:
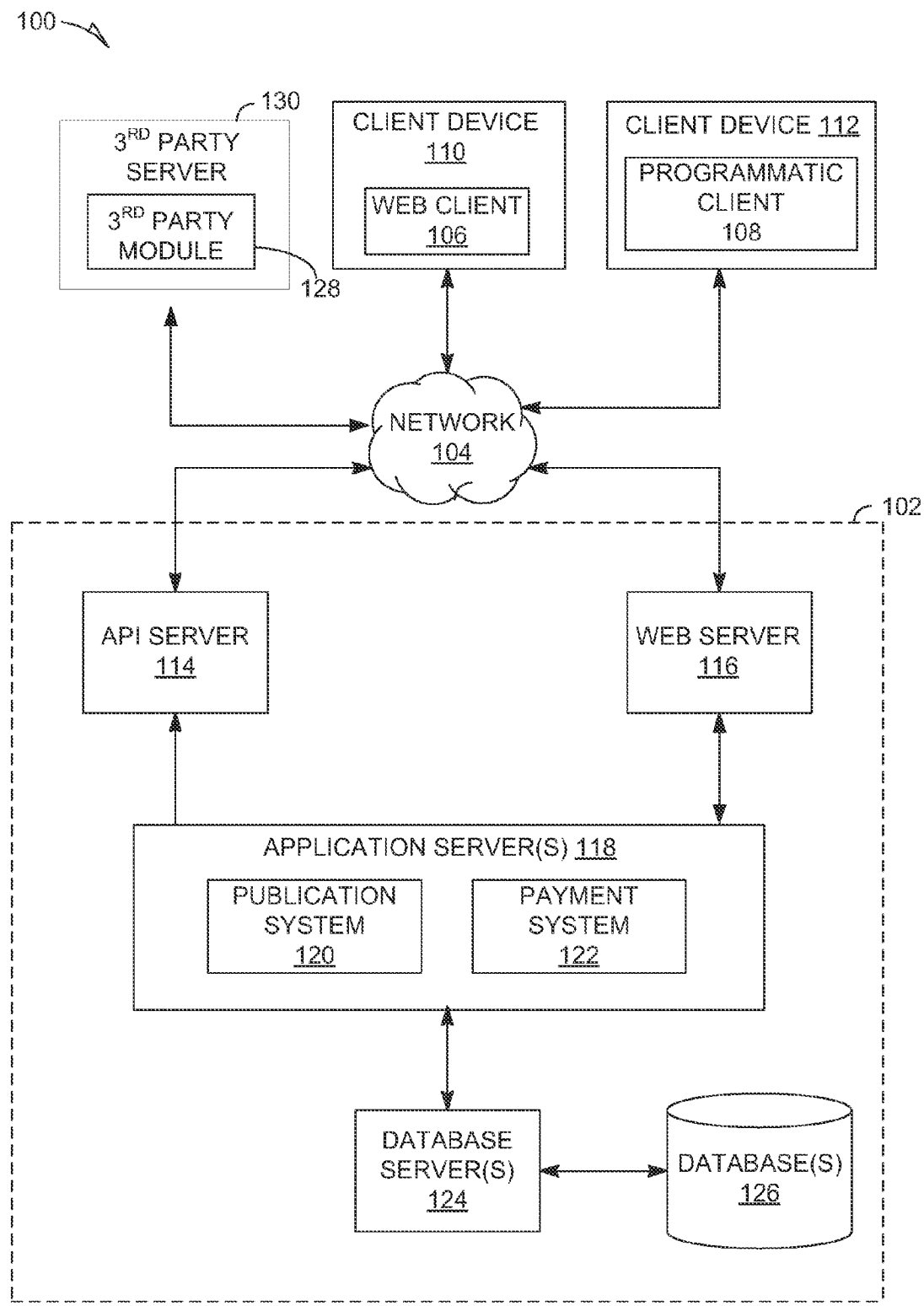
FIG. 1 is a block diagram illustrating an example embodiment of a network architecture of a system used to allow multi-directional visual browsing.

The description that follows includes systems, methods, techniques, instruction sequences, and computing machine program products that embody illustrative embodiments of the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

As used herein, the term "or" may be construed in either an inclusive or exclusive sense. Additionally, although various example embodiments discussed below focus on a network-based search or publication environment, the embodiments are given merely for clarity in disclosure. Thus, any type of electronic search system and method, including various system architectures, may employ various embodiments of the multi-dimensional visual browsing system and method described herein and is considered as being within a scope of example embodiments. Each of a variety of example embodiments is discussed in detail, below.

Example embodiments described herein provide systems and methods for allowing multi-directional visual browsing on an electronic device. According to an example embodiment, a primary result and peripheral results associated with a user of the electronic device are determined. The primary results may be a list of one or more items or categories that are a result of a search or review of an account associated with the user. The peripheral results may be a list of one or more items or categories that are related to the primary results. For example, the peripheral results may comprise accessories, upgrades, similar items, or competitor items of the primary result. Determination of the peripheral results may be based on attributes associated with the items or categories in the primary and peripheral results.

A display layout based on attributes associated with the primary result and the peripheral result is generated. The display layout may position the primary result in a predetermined location (e.g., at a center of the display layout). The peripheral results may then be positioned in proximity to (e.g., around) the primary result (e.g., in two-dimension or three-dimension) based on, for example, navigation direction constraints. For example, some of the peripheral results may positioned in a level lower than a main level where a primary result is position in a three-dimensional display. As such, a user may drill down into the display in order to access the lower level.

The display layout comprising a user interface capable of multi-directional visual browsing is then rendered and displayed on the electronic device. A plurality of navigational directions (e.g., left, right, up, down, diagonal, drill down) is provided on the user interface. Each of the plurality of navigational directions may correspond to a respective attribute (e.g., price, style, brand, color, size) associated with the peripheral results. By providing the plurality of navigation directions, multi-directional visual browsing is enable on the device.

With reference to FIG. 1, an example embodiment of a high-level client-server-based network architecture 100 to allow multi-directional visual browsing on an electronic device of a user is shown. A networked system 102, in an example form of a network-server-side functionality, is coupled via a network 104 to one or more client or electronic devices. FIG. 1 illustrates, for example, a web client 106 operating via a browser (e.g., such as the Internet Explorer® browser developed by Microsoft® Corporation of Redmond, Wash. State) and a programmatic client 108 executing on, respectively, client devices 110 and 112 (e.g., user's electronic device). The client devices 110 and 112 may include, for example, a mobile phone, a personal digital assistant (PDA), a gaming unit, a portable computing unit, or any other electronic device capable of being communicatively coupled to the network 104.

The network 104 over which the networked system 102 and the client devices 110 and 112 interact may be a Global System for Mobile Communications (GSM) network, an Internet Protocol (IP) network, a Wireless Application Protocol (WAP) network, a WiFi network, or a IEEE 802.11 standards network as well as various combinations thereof. Other conventional and/or later developed wired and wireless networks may also be used.

In some embodiments, the client device 110 or 112 may capture and transmit an image of an item of interest to the networked system 102. The image may be captured by a camera built into the client device 110 or 112 or by a digital camera, which is configurable to download its stored images to the client device 110 or 112. In some cases, the image may be a representation of an item of interest (e.g., barcode for the item). Alternatively, the user may locate the image through, for example, the Internet or other image repositories (e.g., using the browser). Additionally, the client device 110 may capture a verbal description of the item of interest. Images (both captured and obtained from other sources) and verbal descriptions are herein collectively referred to as item data.

An Application Program Interface (API) server 114 and a web server 116 are coupled to, and provide programmatic and web interfaces respectively to, one or more application servers 118. The application servers 118 host a publication system 120 and a payment system 122, each of which may comprise one or more modules, applications, or engines, and each of which may be embodied as hardware, software, firmware, or any combination thereof. The application servers 118 are, in turn, coupled to one or more database servers 124 facilitating access to one or more information storage databases or repositories 126.

The databases 126 include a collection of data comprising item images, transaction data, and item attribute information. The item images may be images used in an item listing to show a picture of the item. The item images may also be used for comparison with the item data received from the client device 110 or 112. The transaction data may include information regarding transactions conducted on the networked system 102. The transactional data may include, by way of example, pricing information for an item during a time period. The item attribute information may include information associated with an item including, for example, an image, title, subtitle, category, sub-category, related item listings, average price, quantities of the item currently available, and any other data that may describe and distinguish the item from other items in the database 126 or other items offered using the networked system 102.

The publication system 120 provides a number of publication and marketplace functions and services to users that access the networked system 102. The publication system 120 is discussed in more detail in connection with FIG. 2.

The payment system 122 provides a number of payment services and functions to users. The payment system 122 allows users to accumulate value (e.g., in a commercial currency, such as the U.S. dollar, or a proprietary currency, such as "points") in accounts, and then later to redeem the accumulated value for products (e.g., goods or services) that are made available via the publication system 120. The payment system 122 also facilitates payments from a payment mechanism (e.g., a bank account or credit card) for purchases of items via the network-based marketplace. While the publication system 120 and the payment system 122 are shown in FIG. 1 to both form part of the networked system 102, it will be appreciated that, in alternative embodiments, the payment system 122 may form part of a payment service that is separate and distinct from the networked system 102.

FIG. 1 also illustrates a third party module 128, executing on a third party server 130, as having programmatic access through the network 104 to the networked system 102 via the programmatic interface provided by the API server 114. For example, the third party module 128 may, utilizing information retrieved from the networked system 102, support one or more features or functions on a website (not shown) hosted by the third party. The third party website may, for example, provide one or more promotional, marketplace, or payment functions that are supported by the relevant applications of the networked system 102.

While the example network architecture 100 of FIG. 1 employs a client-server architecture, a skilled artisan will recognize that the present disclosure is not limited to such an architecture. The example network architecture 100 can equally well find application in, for example, a distributed or peer-to-peer architecture system. The publication system 120 and payment system 122 may also be implemented as standalone systems or standalone software programs operating under separate hardware platforms, which do not necessarily have networking capabilities.

Figure 2:
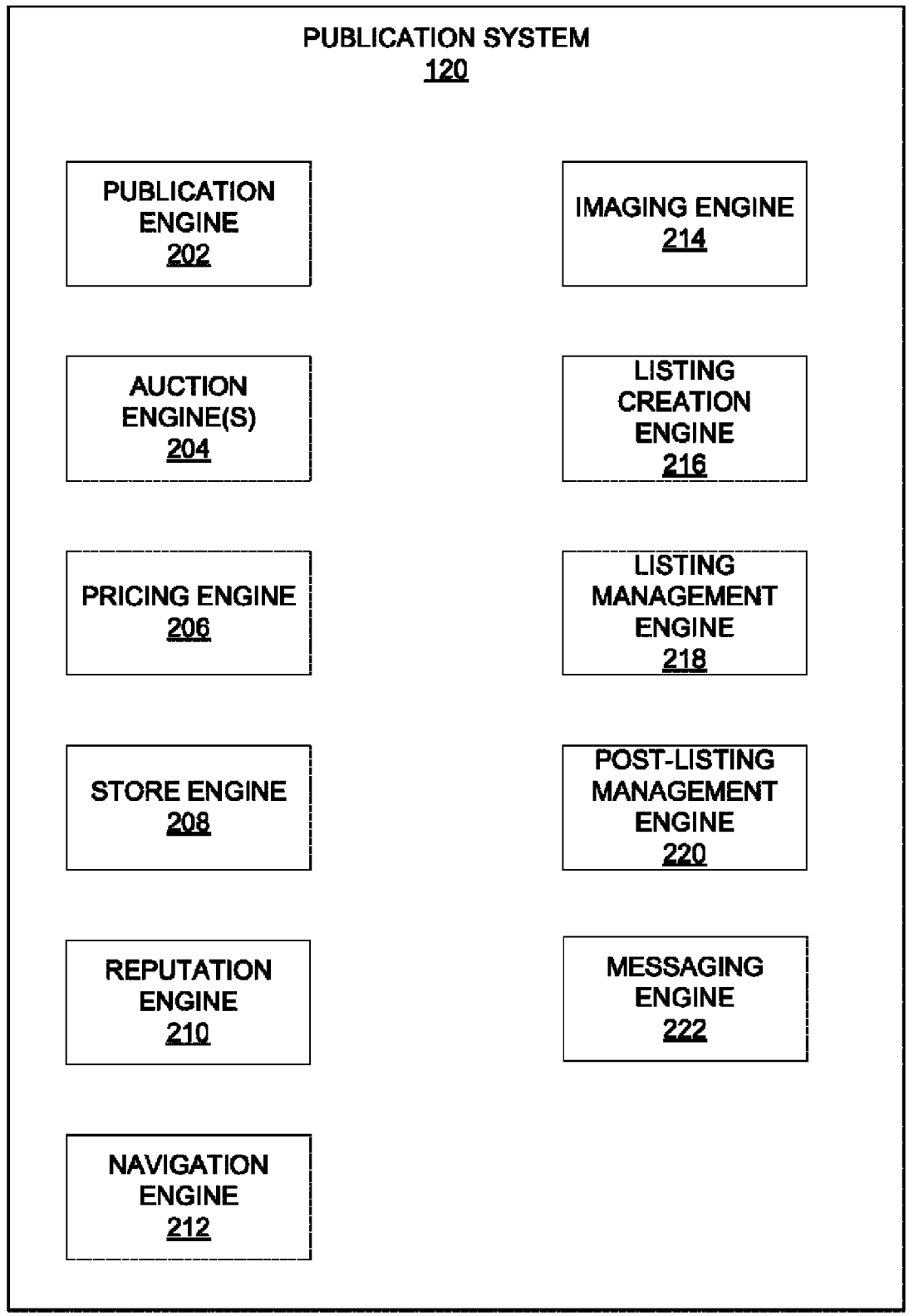
FIG. 2 is a block diagram illustrating an example embodiment of a publication system.

Referring now to FIG. 2, an example block diagram illustrating multiple components that, in one example embodiment, are provided within the publication system 120 of the networked system 102 (see FIG. 1) is shown. The publication system 120 provides data in response to any queries received from the client device 110. The data may then be used by the client device 110 to render a multi-directional visual browsing display.

The publication system 120 may be hosted on dedicated or shared server machines (not shown) that are communicatively coupled to enable communications between the server machines. The multiple components themselves are communicatively coupled (e.g., via appropriate interfaces), either directly or indirectly, to each other and to various data sources, to allow information to be passed between the components or to allow the components to share and access common data. Furthermore, the components may access one or more database(s) 126 via the one or more database servers 124, both shown in FIG. 1.

In one embodiment, the networked system 102 provides a number of publishing, listing, and price-setting mechanisms whereby a seller may list (or publish information concerning) goods or services for sale, a buyer can express interest in or indicate a desire to purchase such goods or services, and a price can be set for a transaction pertaining to the goods or services. To this end, the publication system 120 may comprise at least one publication engine 202 and one or more auction engines 204 that support auction-format listing and price setting mechanisms (e.g., English, Dutch, Chinese, Double, Reverse auctions, etc.). The various auction engines 204 also provide a number of features in support of these auction-format listings, such as a reserve price feature whereby a seller may specify a reserve price in connection with a listing and a proxy-bidding feature whereby a bidder may invoke automated proxy bidding.

A pricing engine 206 supports various price listing formats. One such format is a fixed-price listing format (e.g., the traditional classified advertisement-type listing or a catalogue listing). Another format comprises a buyout-type listing. Buyout-type listings (e.g., the Buy-It-Now (BIN) technology developed by eBay Inc., of San Jose, Calif.) may be offered in conjunction with auction-format listings and allow a buyer to purchase goods or services, which are also being offered for sale via an auction, for a fixed-price that is typically higher than a starting price of an auction for an item.

A store engine 208 allows a seller to group listings within a "virtual" store, which may be branded and otherwise personalized by and for the seller. Such a virtual store may also offer promotions, incentives, and features that are specific and personalized to the seller. In one example, the seller may offer a plurality of items as Buy-It-Now items in the virtual store, offer a plurality of items for auction, or a combination of both.

A reputation engine 210 allows users that transact, utilizing the networked system 102, to establish, build, and maintain reputations. These reputations may be made available and published to potential trading partners. Because the networked system 102 supports person-to-person trading between unknown entities, users may otherwise have no history or other reference information whereby the trustworthiness and credibility of potential trading partners may be assessed. The reputation engine 210 allows a user, for example through feedback provided by one or more other transaction partners, to establish a reputation within the networked system 102 over time. Other potential trading partners may then reference the reputation for purposes of assessing credibility and trustworthiness.

Navigation of the network-based marketplace may be facilitated by a navigation engine 212. For example, a search module of the navigation engine 212 enables keyword searches of item listings published via the publication system 120. In a further example, a browser module of the navigation engine 212 allows users to browse various category, catalogue, or inventory data structures according to which listings may be classified within the publication system 120. Furthermore, the navigation engine 212 in conjunction with the display engine 224 provides data and instructions to allow multi-directional visual browsing on the client device (e.g., client device 110). Various other navigation applications within the navigation engine 212 may be provided to supplement the searching and browsing applications.

In other embodiments, image data (e.g., an image captured by a camera or a verbal description of an item) received from the client device 110 may be used to search for items similar to those depicted by the image data. The image data may be compared to items available via the publication system 120 (e.g., in item listings). In one embodiment, the item information or item listing may be stored in the database 126.

In order to make listings available via the networked system 102 as visually informing and attractive as possible, the publication system 120 may include an imaging engine 214 that enables users to upload images for inclusion within listings and to incorporate images within viewed listings. The imaging engine 214 may also receive image data from a user and utilize the image data to identify an item depicted or described by the image data.

A listing creation engine 216 allows sellers to conveniently author listings pertaining to goods or services that sellers wish to transact via the networked system 102, while a listing management engine 218 allows sellers to manage such listings. Specifically, where a particular seller has authored or published a large number of listings, the management of such listings may present a challenge. The listing management engine 218 provides a number of features (e.g., auto-relisting, inventory level monitors, etc.) to assist the seller in managing such listings.

A post-listing management engine 220 also assists sellers with a number of activities that typically occur post-listing. For example, upon completion of an auction facilitated by the one or more auction engines 204, a seller may wish to leave feedback regarding a particular buyer. To this end, the post-listing management engine 220 provides an interface to the reputation engine 210 allowing the seller to conveniently provide feedback regarding multiple buyers to the reputation engine 210.

A messaging engine 222 is responsible for the generation and delivery of messages to users of the networked system 102. Such messages include, for example, advising users regarding the status of listings and best offers (e.g., providing an acceptance notice to a buyer who made a best offer to a seller). The messaging engine 222 may utilize any one of a number of message delivery networks and platforms to deliver messages to users. For example, the messaging engine 222 may deliver electronic mail (e-mail), an instant message (IM), a Short Message Service (SMS), text, facsimile, or voice (e.g., Voice over IP (VoIP)) messages via wired networks (e.g., the Internet), a Plain Old Telephone Service (POTS) network, or wireless networks (e.g., mobile, cellular, WiFi, WiMAX).

Although the various components of the publication system 120 have been defined in terms of a variety of individual modules and engines, a skilled artisan will recognize that many of the items can be combined or organized in other ways. Furthermore, not all components of the publication system 120 have been included in FIG. 2. In general, components, protocols, structures, and techniques not directly related to functions of example embodiments (e.g., dispute resolution engine, loyalty promotion engine, personalization engines, etc.) have not been shown or discussed in detail. The description given herein simply provides a variety of example embodiments to aid the reader in an understanding of the systems and methods used herein. While the publication system 120 is described in a marketplace embodiment, it should be noted that the publication system 120 may be used in any search environment.

Figure 3:
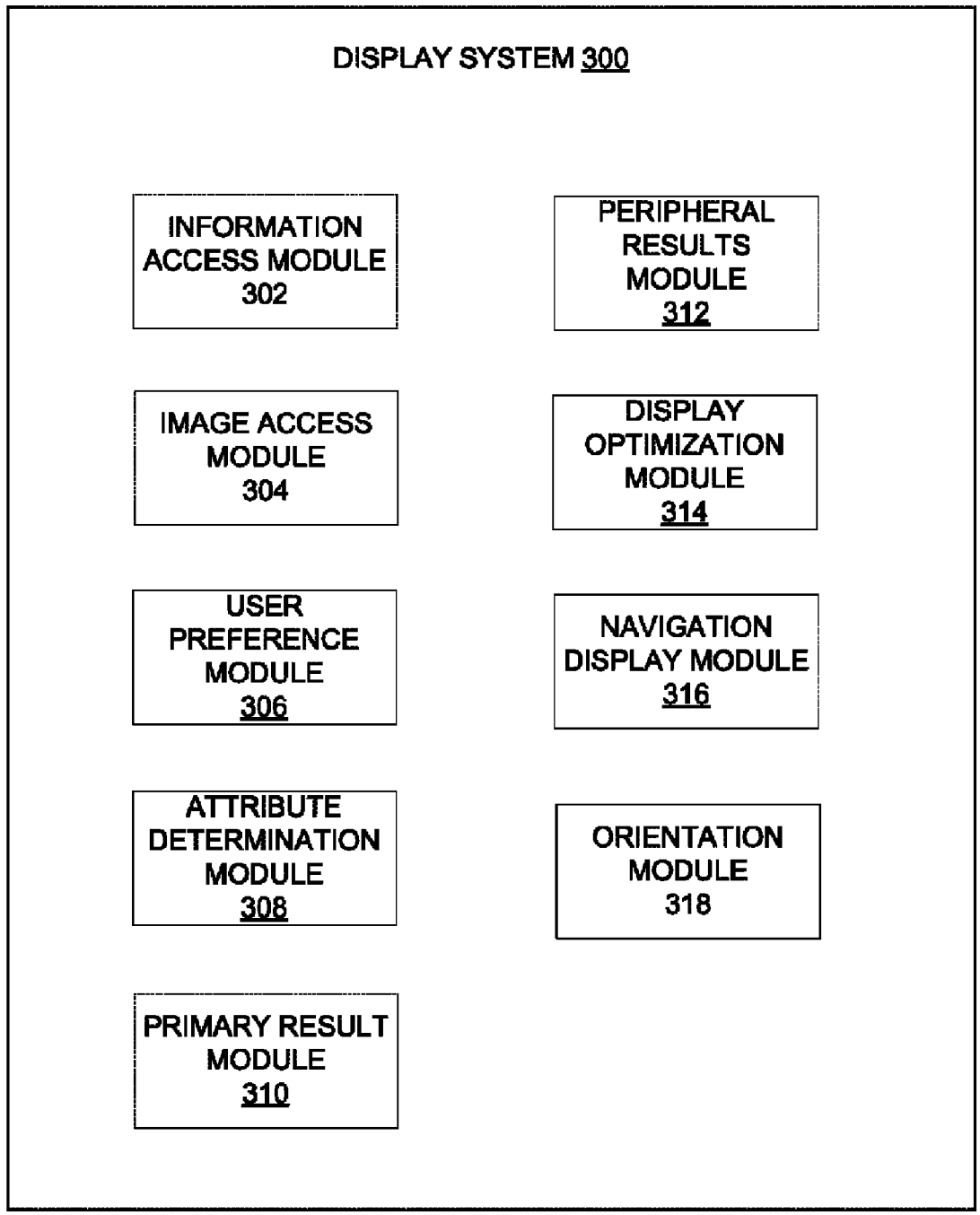
FIG. 3 is a block diagram illustrating an example embodiment of a display system of the client device.

Application of Embodiments of the Multi-Directional Visual Browsing Platform into the Example Client Device Referring now to FIG. 3, an example diagram of a display system 300 of the client device 110 is shown. The display system 300, in conjunction with a navigation system (discussed in connection with FIG. 4), provides mechanisms for enabling the client device 110 to provide multi-directional visual browsing to a user.

The display system 300 determines proper placement of components on a multi-directional visual browser and renders the multi-directional visual browser at the client device 110. In example embodiments, the display system 300 comprises an information access module 302, an image access module 304, a user preference module 306, an attribute determination module 308, a primary result module 310, a peripheral result module 312, a display optimization module 314, a navigation display module 316, and an orientation module 318. Alternative embodiments may comprise less modules or, alternatively, additional components or modules not directly related to example embodiments of the multi-directional visual browsing system, and thus are not shown or discussed. Furthermore, some of the components of the display system 300 may be located elsewhere.

The information access module 302 accesses data used to provide multi-directional visual browsing at the client device 110. In example embodiments, the information access module 302 receives an initial request from the client device 110 for information to be displayed in a multi-directional visual browser display. The initial request may comprise a search query for an item or information on an item. The information access module 302 sends the request to the publication system 120 to access various databases (e.g., databases 126) to obtain information, such as attributes of various items to be displayed in a multi-directional visual browser display.

The image access module 304 accesses an image associated with the client device 110 for further use. In one instance, the image may be used in a search query for an item or information on the item. The image may be originally obtained from an image capturing device (e.g., a camera) or from the Internet.

The user preference module 306 determines preferences associated with the user or client device 110 that is requesting multi-directional visual browsing. In one embodiment, a pattern of usage is tracked and used by the preference module 306 to determine preferences. The preferences may include display preferences (e.g., size of images or speed of navigation on the device) or result preferences (e.g., a previously purchased item may be a primary result used to determine peripheral results as will be discussed further below). User preferences may also be set by the user of the client device 110. The user preference may be used to optimize the display of a multi-directional visual browser display as will be discussed in more detail below.

The attribute determination module 308 determines attributes of items that may be displayed. In example embodiments, the attributes of items may be retrieved from the database 126 via the network 104 (e.g., in response to a search query). In some embodiments, the attribute determination module 308 may use user preferences in determining preferred attributes. The preferred attributes may be considered when determining the primary and peripheral results.

The primary result module 310 determines a primary result comprising an item or category that may be displayed in a predetermined (first) location (e.g., at a center of a display). The primary result may be determined based on results of the search query, determined attributes, and user preferences.

The peripheral result module 312 determines additional items that are related to the primary result item or category. For example, the peripheral results may comprise accessories, upgrades, similar items, or competitor items of the primary result. Determination of the peripheral results may be based on attributes associated with the items or categories in the primary and peripheral results.

The display optimization module 314 optimizes the multi-directional visual browser display on the client device 110. The display optimization module 314 may generate a display layout for the primary and peripheral results. In one embodiment, the primary result is positioned centered on the display layout. In other embodiments, the primary result may be positioned in other locations of the display layout (e.g., to the right or left of center or in a corner of the display layout) based on, for example, user preferences. The peripheral results are positioned, based on their attributes, around the primary result. In some embodiments, the optimization may be based on, for example, constraints of the client device 110, number and types of items to be displayed, and user preferences.

The navigation display module 316 determines, displays, and renders operable navigation options on the multi-directional visual browser display. The navigation display module 316 works in conjunction with the navigation system, discussed in more detail in connection with FIG. 4, to provide the navigation options. For example, the navigation display module 316 may create a frame around each display item or category and provide a navigation control overlay over the multi-directional visual browser display to illustrate possible directions for multi-directional visual browsing. For example, graphical arrows may be drawn to indicate possible browsing/navigation directions. This may be useful when, for example, one direction of browsing is not available. Furthermore, attribute information, additional items of interests, coupons, deals, and various forms of information that may be pertinent to the current display including warnings and/or errors may be provided in an overlay. In another embodiment, the navigation display may be a series of buttons across one side of the frame of a grid depiction of an item.

The orientation module 318 determines an orientation of the client device 110 in order to render the multi-directional visual browser display in a correct orientation. The orientation module 318 may be optional in client devices 110 that operate in a single orientation.

The display system 300 may contain other modules to enhance the functions of the multi-directional visual browser display. For example, a positional information module (not shown) may be provided to obtain positional information (e.g., GPS data, triangulation data), which may be used to assist in completing a transaction or providing information on proximity to a resource or an item of interest.

Figure 4:
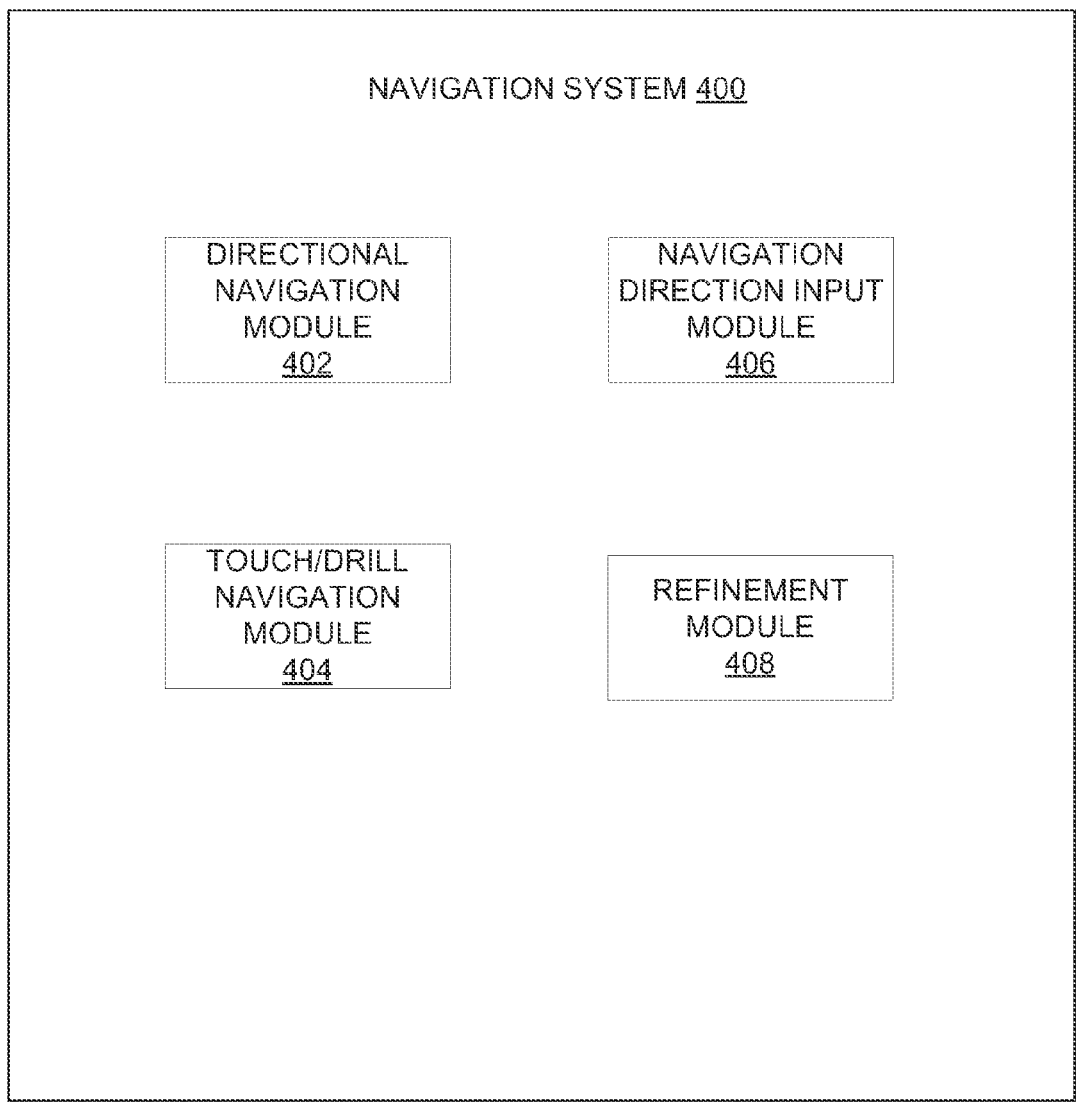
FIG. 4 is a block diagram illustrating an example embodiment of a navigation system of the client device.

Referring now to FIG. 4, a navigation system 400 of the client device 110 is shown. The navigation system 400 works in conjunction with the display system 300 to receive and process navigation inputs and provide results. The result may be a new multi-directional visual browser display. The navigation system 400 comprises a directional navigation module 402, a touch/drill navigation module 404, a navigation direction input module 406, and a refinement module 408.

The directional navigation module 402 receives and processes a navigational input provided by a user of the client device 110. The directional navigation module 402 receives navigational inputs from the client device 110 and may trigger operations of, for example, the information access module 302 or the refinement module 408 in response. The navigational inputs may comprise, for example, a scrolling action in a particular direction (e.g., up, down, left, right, or diagonally) on the client device 110. For example, the user may indicate a direction in which to navigate the multi-directional visual browser display.

The touch/drill navigation module 404 also receives navigational inputs from a user. However, the navigational inputs, in this case, may be a tap selection (e.g., dual touch), whereby the user of the client device selects a representation of an item or category by tapping a corresponding image of the item or category on the multi-directional visual browser display. Alternatively, the navigational-input may trigger a drill down into a lower level of a multi-level display.

The navigation direction input module 406 determines in which direction to traverse the user interface of the multi-directional visual browser display in order to provide a next display. In example embodiments, the navigation direction input module 406 will receive information from the directional navigation module 402 or the touch/drill navigation module 404 as to the navigation input. Using the received information, the navigation direction input module 406 may work with the refinement module 408 to provide a next set of results. Alternatively, the navigation direction input module 406 may trigger a purchase, sale, or posting of an item or more information on an item or may direct a path to additional images or information on an item when the user indication is not a directional input (e.g., an indication of a direction to take the multi-directional visual browser display).

The refinement module 408 performs analysis to determine a next set of results (e.g., both primary and peripheral) for presentation in a multi-directional visual browser based on the navigation input being an indication to traverse the multi-directional visual browser display in a particular direction. In example embodiments, the refinement module 408 may receive updated result data from the application server 118 based on the navigational input and determines the updated primary result and updated attribute information (e.g., associated categories, brand, model number) associated with the primary result. In some embodiments, the primary result module 310 may determine the updated primary result and the attribute determination module 308 may determine the updated attribute information and provide the updated attribute information to the refinement module 408. Using the updated attribute information, related items (e.g., having similar attributes) may be determined by the refinement module 408 or the peripheral result module 312. For example, if the primary result is Sony® Playstation 2, then the related items may include accessories for the Sony® Playstation 2 (e.g., game controllers, games), other versions of the Sony® Playstation 2 (e.g., Sony® Playstation 3), or competitor brands (e.g., Nintendo® Wii). These related items comprise the peripheral results. The primary and peripheral results may then be provided to the display optimization module 314 in order to render a new multi-directional visual browser display.

As such, when a navigation input is received by the directional navigation module 402 or the touch/drill navigation module 404, the refinement module 408 refines the results. Thus, a directional input in a direction towards games for the Sony® Playstation 2 may change the primary result to games for the Sony® Playstation 2 and peripheral results may include the Sony® Playstation 2 consoles, games for other brands, or individual game titles.

It should be noted that some of the modules of the display system 300 and navigation system 400 may be located at one or more of the application servers 118. For example, a version of the primary result module 310, peripheral results module 312, and display optimization module 314 may be located at one or more application servers 118. Thus, the application server 118 may perform a search, determine the primary and peripheral results, generate a display layout for the results, and send the display layout to the client device 110 for display.

Figure 5:
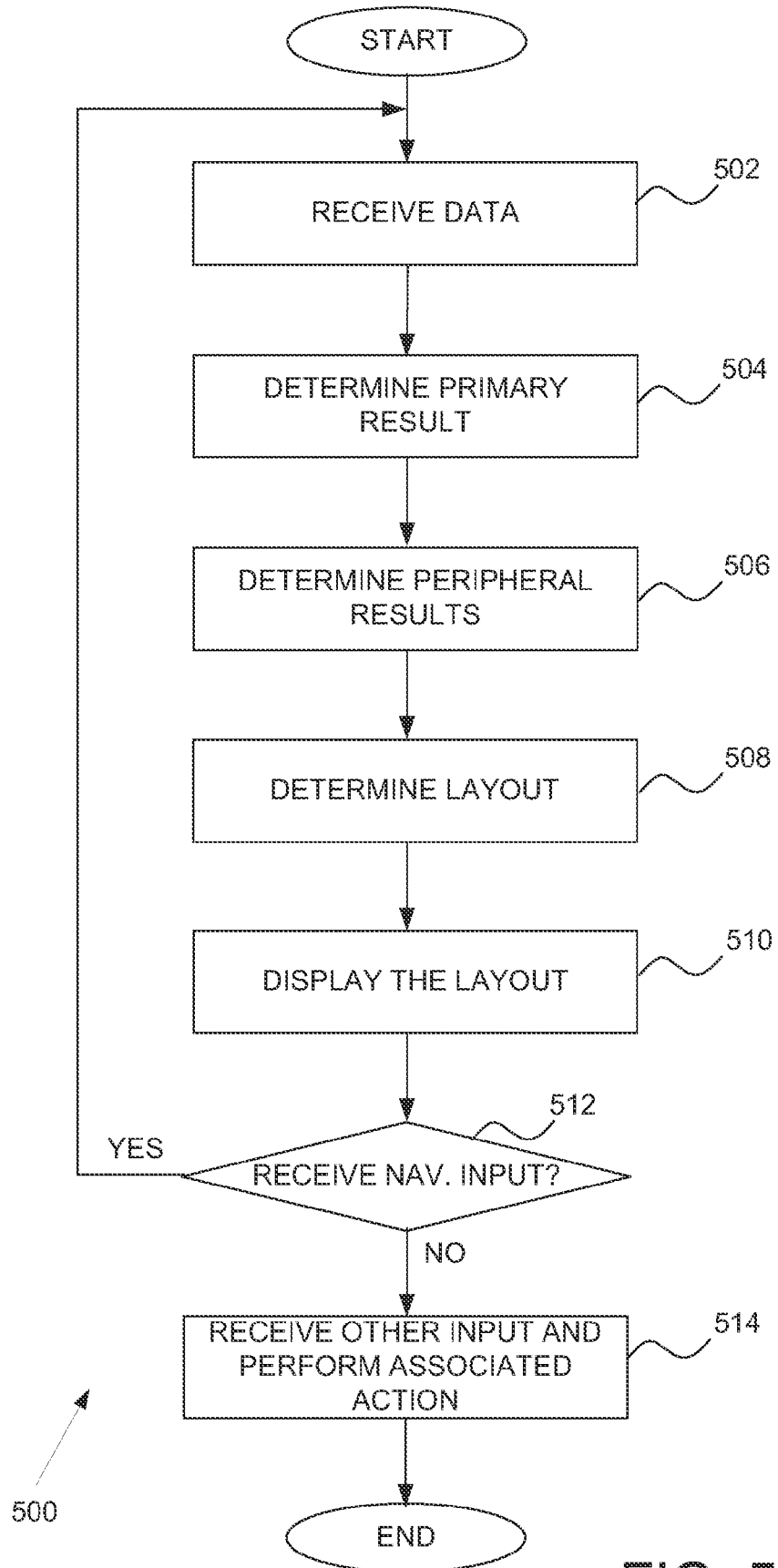
FIG. 5 is a flowchart illustrating a method for allowing multi-directional browsing on the client device.

FIG. 5 is a flowchart illustrating a method 500 for providing multi-directional browsing at a client device (e.g., client device 110). At operation 502, data is received from the application server 118. The data may be received in response to a search query sent by the client device 110. The data may include images and information regarding an item of interest in the search query. In one embodiment, the item of interest is a product or service available for sale or auction on a publication system, such as a networked, electronic marketplace.

In operation 504, a primary result is determined. In example embodiments, the primary result module 310 determines the primary result based on the search query and user preferences. The primary result may be a main result that is a focus of the user's search (e.g., item of interest). In some embodiments, the primary result may be a result of a keyword search, an image data search, or traversal of the product infrastructure. In other embodiments, the primary result may be based on one or more lists associated with an account of a user (e.g., "watching" list, favorite seller list, past purchased items list).

At operation 506, peripheral results are determined. In example embodiments, the peripheral results module 312 determines additional items that are related to the primary result item or category based on attributes and any user preferences. For example, the peripheral results may comprise accessories, upgrades, similar items, or competitor items of the primary result. Operation 506 will be discussed in more detail in connection with FIG. 6.

A display layout is determined at operation 508. The display layout may be determined by the display optimization module 314 and comprises a guide for displaying the primary and peripheral results at the client device 110. Operation 508 will be discussed in further detail in FIG. 7.

At operation 510, the display layout of the multi-directional visual browser display is rendered and displayed on the client device 110. The display may include navigation controls, such as a graphical overlay, highlighted buttons on the peripheral of the display, or controls integrated into the display.

Subsequently, at operation 512, a determination is made as to whether a navigation input is received from the user of the client device 110. A navigation input is a result of a user physically indicating on the multi-directional visual browser display a navigation input. In an example embodiment, the navigational input, on, for example, a touch screen, may include a swipe (e.g., up, down, left, right, or diagonally), press and hold, dual touch, multi-touch, pinch, or other inputs. In embodiments where the navigational input is a tap of dual touch selection, a result of the tap selection may be a drill down on the selected representation. For example, if the selection is of a category of goods (e.g., Sony® Playstation 2), the drill down may result in individual items within the category (e.g., Sony® Playstation 2 consoles) being offered for auction or sale. In yet another embodiment, the navigational input may be received from a joystick, a keyboard, a mouse, an eye movement detection camera system, gesture input, or other inputs. In further embodiments, tilting of the client device 110 may accelerate scrolling along a tilted direction.

If a navigation input is received, then the method returns to operation 502 where updated data may be received from the application server 118 in response to the navigation input. The updated primary result and peripheral results may then be determined. In alternative embodiments, the data may have been previously received (e.g., in the results from the initial search query) and used to determine the updated results.

Alternatively, other inputs may be received in operation 514 and performed. For example, the user may indicate to purchase an item displayed on the multi-directional visual browser display. In this case, a purchase indication may be sent to one or more of the modules of the publication system 120 to process the purchase.

Figure 6:
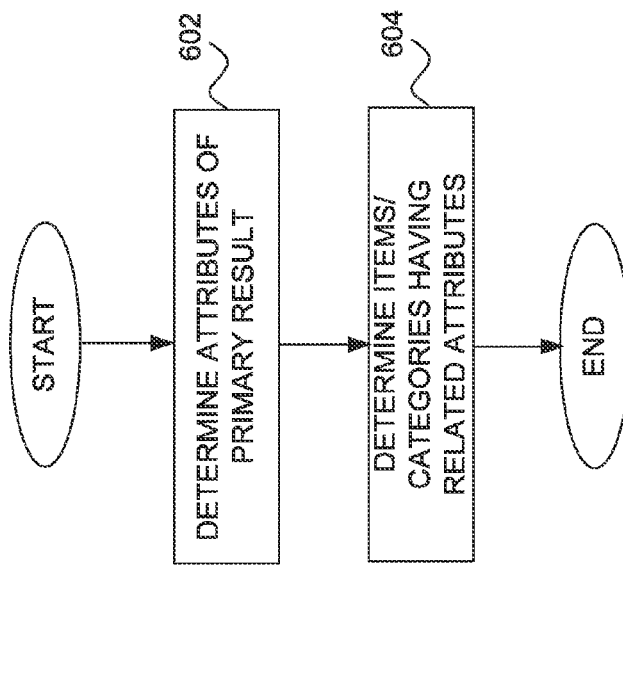
FIG. 6 is a flowchart illustrating a method for determining peripheral results.

FIG. 6 is a flowchart illustrating a method for determining a peripheral result (e.g., operation 506). At operation 602, attributes for the primary result are determined. In example embodiments, the attribute determination module 308 in conjunction with the primary result module 310 receives the data from the publication system 120 and determines attributes (e.g., associated categories, brand, model number, average price, or any other information that may distinguish an item or category from other items or categories) associated with the primary result.

Using the attribute information for the primary result, related items or categories of items (e.g., having similar attributes) are determined at operation 604 by the peripheral results module 312. These related items or categories comprise the peripheral results. In some embodiments, user preferences may be factored into the determination of the peripheral results. For example, if the user has a history of purchasing games for the Sony Playstation II, then the peripheral results may be customized to provide more items related to games rather than, for example, console accessories.

Figure 7:
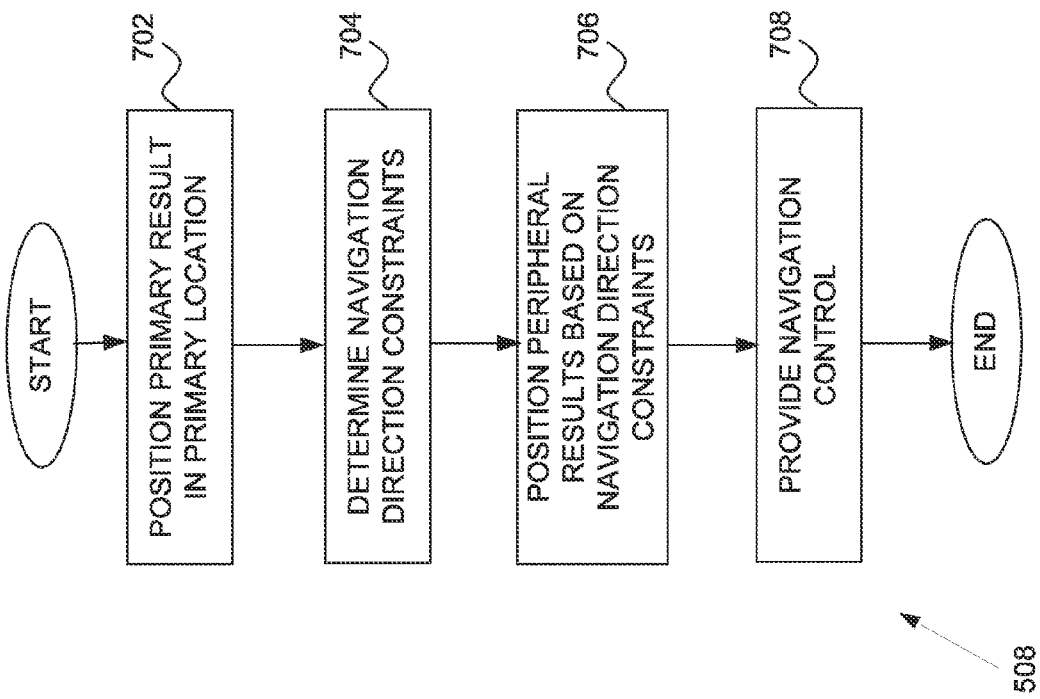
FIG. 7 is a flowchart illustrating a method for generating a display layout.

FIG. 7 is a flowchart illustrating a method for generating a display layout (e.g., operation 508). In example embodiments, the display layout is generated by the display optimization module 314. At operation 702, the primary result is positioned at a predetermined location. In one embodiment, the predetermined location is at a center of the display layout. Alternative embodiments, may locate the predetermined location anywhere on the display layout, for example, based on user preferences. The item(s), category, or categories of the primary result will be visually represented at the predetermined location once rendered on the client device 110.

Navigation direction constraints are determined at operation 704. The navigation direction constraints provide guidance as to where items/categories should be located. In a two-dimensional embodiment, the navigation direction constraints may be provided in any number of directions in a radial form from a central position. In yet another embodiment, navigation directions may be enabled for a three-dimensional plane. In this embodiment, a category may be drilled down into so as to arrive at a second or lower level or plane populated with a plurality of items within the category. Further levels or planes may be provided. In yet another embodiment, the navigational direction may include a three-dimensional plane having topographical features based on attributes of the device.

For example, the navigation direction constraint may indicate that accessories should be positioned to the left of the predetermined location, while another navigation direction constraint may indicate that related versions of the primary result (e.g., upgraded version) should be positioned diagonally to a top right of the predetermined location and similar competitor products should be positioned above the predetermined location.

The navigation direction constraints may be generated by the display optimization module 314. Alternatively, generic navigation direction constraints may be stored in a database and the display optimization module 314 accesses the stored navigation direction constraints. The display optimization module 314 applies the navigation direction constraints to the primary result attributes to determine the proper navigation direction constraints to be used in a current display layout.

Once the navigation direction constraints are determined, the peripheral results are positioned on the display layout based on the navigation direction constraints at operation 706. For example, a Sony® Playstation 2 console category (e.g., primary result) may be positioned in a center or predetermined location of the display layout. Game controllers and games (e.g., accessories) may be positioned to the left and right of the console, respectively. Individual models of consoles available via a network-based marketplace or publication system may be positioned below the console category in one embodiment. In an alternative embodiment, the individual models of consoles may be positioned in a drill down from the console category (e.g., the primary result) or the individual models may be positioned in the center of the layout. Other versions of the Sony® Playstation 2 (e.g., Sony® Playstation 3) may be located diagonally up from the centered primary result. In the example, competitor brands (e.g, Nintendo® Wii) may be positioned directly above the centered primary result.

In operation 708, a navigation control display is provided. In some embodiments, the navigation control display may be provided as a display overlay on the multi-directional visual browser display to illustrate possible directions for multi-directional visual browsing. This may be useful when, for example, one direction of browsing is not available. It should be noted that operation 708 is optional.

FIG. 8 is an example of an electronic device or client device 800 (e.g., client device 110) illustrating a multi-directional visual browser display 802 according to an example embodiment. As shown, the multi-directional visual browser display 802 is illustrated in a grid format comprising a plurality of image blocks 804. Each image block 804 visually represents an item or category. In example embodiments, an image of the item or category is included in each image block 804. Information regarding the item or category may also be provided on the image block 804. Furthermore, more information regarding each item may be obtained by drilling down on the selected item.

While the embodiment of FIG. 8 is arranged in the grid format, the arrangement may be a circular formation, a triangular formation, or any other shape formation. The multi-dimensional visual browser may, in alternative embodiments, be topographically populated, populated by layers of attributes, or be three-dimensional. By example, another embodiment may arrange the items according to an importance or hierarchy provided to the items by user preferences or popularity.

A primary result is display at a predetermined location. The predetermined location may comprise one or more image blocks 804 of the multi-directional visual browser display 802. In one embodiment, the predetermined location is located at the center of the multi-directional visual browser display 802. Alternatively, the predetermined location may be a corner, top, bottom, right, or left position of the multi-directional visual browser display 802.

While not shown in FIG. 8, navigational controls may be displayed. In various embodiments, the navigation controls may be a graphical overlay over the image blocks 804 (e.g., at edges of the multi-directional visual browser display 802), may be highlighted buttons on the periphery of the display, or may be graphical controls integrated into the display.

Modules, Components, and Logic

Certain embodiments described herein may be implemented as logic or a number of modules, engines, components, or mechanisms. A module, engine, logic, component, or mechanism (collectively referred to as a "module") may be a tangible unit capable of performing certain operations and configured or arranged in a certain manner. In certain example embodiments, one or more computer systems (e.g., a standalone, client, or server computer system) or one or more components of a computer system (e.g., a processor or a group of processors) may be configured by software (e.g., an application or application portion) or firmware (note that software and firmware can generally be used interchangeably herein as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor, application specific integrated circuit (ASIC), or array) to perform certain operations. A module may also comprise programmable logic or circuitry (e.g., as encompassed within a general-purpose processor or other programmable processor) that is temporarily configured by software or firmware to perform certain operations. It will be appreciated that a decision to implement a module mechanically, in the dedicated and permanently configured circuitry, or in temporarily configured circuitry (e.g., configured by software) may be driven by, for example, cost, time, energy-usage, and package size considerations.

Accordingly, the term module should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices and can operate on a resource (e.g., a collection of information).

Example Machine Architecture and Machine-Readable Medium

Figure 9:
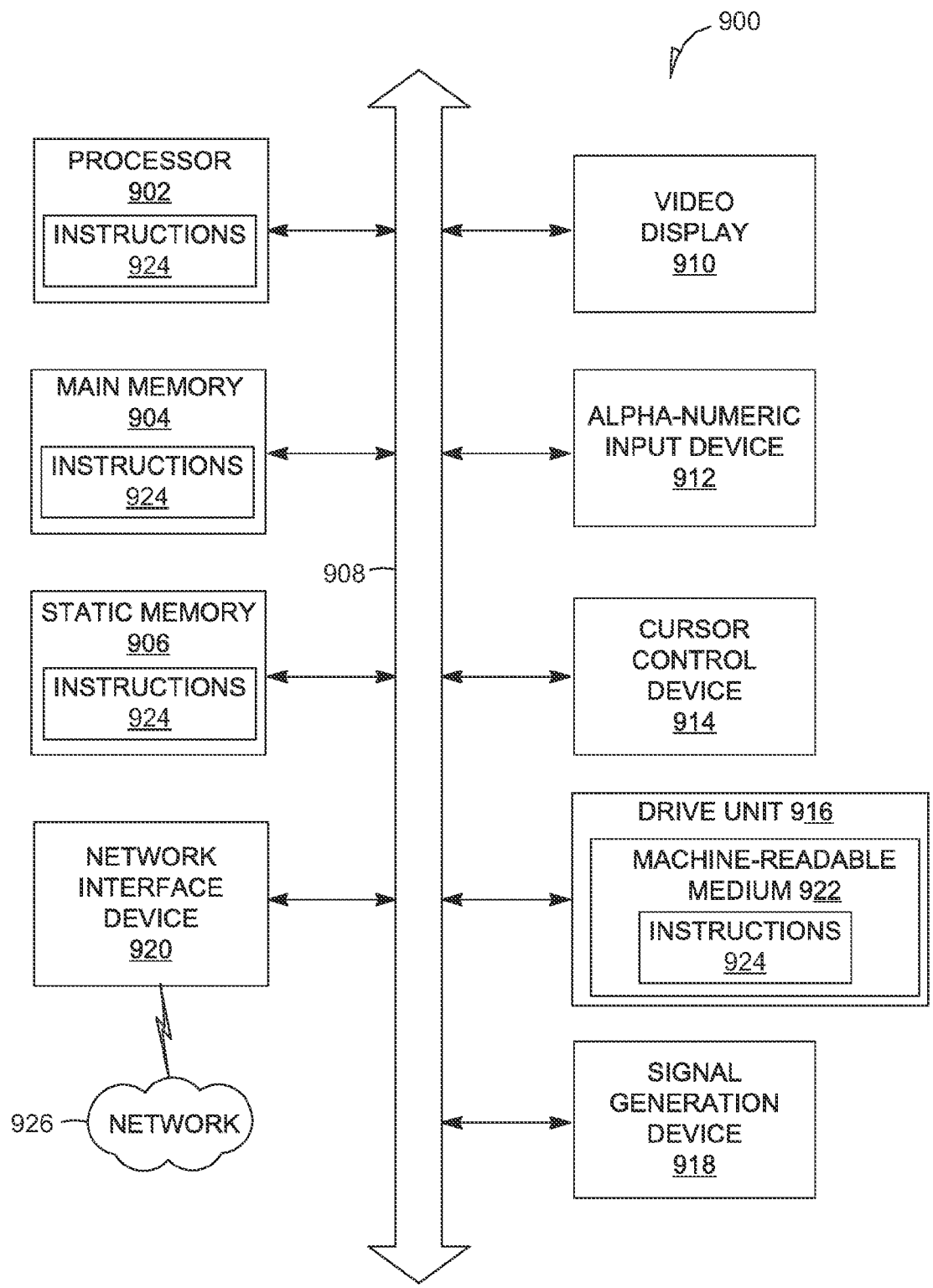
FIG. 9 is a simplified block diagram of a machine in an example form of a computing system within which a set of instructions for causing the machine to perform any one or more of the methodologies discussed herein may be executed.

With reference to FIG. 9, an example embodiment extends to a machine in the example form of a computer system 900 within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, a switch or bridge, or any machine capable of executing instructions (sequential or otherwise) that specify actions to be taken by that machine. Further, while only a single machine is illustrated, the term "machine" shall be taken to include any collection of machines that individually or jointly execute a set (or multiple sets) of instructions to perform any one or more of the methodologies discussed herein.

The example computer system 900 may include a processor 902 (e.g., a central processing unit (CPU), a graphics processing unit (GPU) or both), a main memory 904 and a static memory 906, which communicate with each other via a bus 908. The computer system 900 may further include a video display unit 910 (e.g., a liquid crystal display (LCD) or a cathode ray tube (CRT)). In example embodiments, the computer system 900 also includes one or more of an alpha-numeric input device 912 (e.g., a keyboard), a user interface (UI) navigation device or cursor control device 914 (e.g., a mouse), a disk drive unit 916, a signal generation device 918 (e.g., a speaker), and a network interface device 920.

Machine-Readable Medium

The disk drive unit 916 includes a machine-readable storage medium 922 on which is stored one or more sets of instructions 924 and data structures (e.g., software instructions) embodying or used by any one or more of the methodologies or functions described herein. The instructions 924 may also reside, completely or at least partially, within the main memory 904 or within the processor 902 during execution thereof by the computer system 900, the main memory 904 and the processor 902 also constituting machine-readable media.

While the machine-readable storage medium 922 is shown in an example embodiment to be a single medium, the term "machine-readable medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of embodiments of the present invention, or that is capable of storing, encoding, or carrying data structures used by or associated with such instructions. The term "machine-readable medium" shall accordingly be taken to include, but not be limited to, solid-state memories and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

Transmission Medium

The instructions 924 may further be transmitted or received over a communications network 926 using a transmission medium via the network interface device 920 and utilizing any one of a number of well-known transfer protocols (e.g., HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible medium to facilitate communication of such software.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method to provide multi-directional visual browsing on a device, the method comprising:
    determining a primary result and peripheral results associated with the device, the primary result being based on a search criteria and the peripheral results being related to the primary result based on attributes associated with the primary result and the peripheral results;
    generating a display layout that positions the primary result in a predetermined location of a multi-directional visual browser display and positions the peripheral results in proximity to the primary result based on the attributes, the peripheral results being positioned in a plurality of navigational directions from the predetermined location, each navigational direction corresponding to a respective attribute associated with the peripheral results; and
    rendering, using one or more processors, the display layout on the device to provide the multi-directional visual browser display.

2. The method of claim 1, wherein the determining of the primary result comprises performing a search query, the search criteria including keywords used in the search query.

3. The method of claim 1, wherein the search criteria includes an image used in an image comparison search query.

4. The method of claim 1, wherein the determining of the primary result comprises reviewing one or more lists associated with an account of a user of the device.

5. The method of claim 1, wherein the determining of the peripheral results comprises determining the attributes of the primary result and discovering items or categories having related attributes, the items or categories having the related attributes resulting in the peripheral results.

6. The method of claim 1, further comprising applying user preferences in the determining of the primary and peripheral results.

7. The method of claim 1, wherein the predetermined location is at a center of the multi-directional visual browser display.

8. The method of claim 1, wherein the generating of the display layout comprises positioning the peripheral results around the predetermined location based on attributes of the peripheral results and navigation direction constraints.

9. The method of claim 1, thither comprising applying user preferences in the generating of the display layout.

10. The method of claim 1, wherein the display layout is a three-dimensional display layout and the generating of the display layout comprises positioning the primary result in a main level of the three-dimensional display layout.

11. The method of claim 10, further comprising positioning at least a part of the peripheral results in a level of a three-dimensional display layout lower than the main level where the primary result is positioned.

12. The method of claim 1, wherein the rendering of the display layout comprises providing navigational controls indicating the navigational directions on a user interface.

13. The method of claim 1, further comprising:
    receiving a navigational input;
    determining an updated primary result and updated peripheral results based on the navigational input;
    generating a new display layout based on attributes associated with the updated primary result and the updated peripheral results; and
    rendering the new display layout on the device.

14. A system to provide multi-directional visual browsing, the system comprising:
    a primary result module to determine a primary result based on a search criteria;
    an attribute determination module to determine attributes associated with the primary result;
    a peripheral result module to determine peripheral results based on the primary result and the determined attributes; and
    a display optimization module to generate a display layout, the display layout positioning the primary result in a predetermined location of a multi-directional visual browser display and positioning the peripheral results in proximity to the primary result based on attributes of the peripheral results determined by the attribute determination module, and to render the display layout on a device to provide the multi-directional visual browser display, the peripheral results being positioned in a plurality of navigational directions from the predetermined location, each navigational direction corresponding to a respective attribute associated with the peripheral results.

15. The system of claim 14, further comprising an information access module to obtain data in response to the search criteria and used by the primary result module and the peripheral result module to determine the primary and peripheral results.

16. The system of claim 14, further comprising a user preference module to provide user preferences in determining the peripheral results and the generating of the display layout.

17. The system of claim 14, further comprising a navigation display module to provide navigation controls indicating navigational directions on a user interface.

18. The system of claim 14, further comprising:
    a navigation module to receive a navigation input from a user of the device; and
    a navigation direction input module to determine, based on the navigation input, which direction to traverse the multi-directional visual browser display in order to provide a next display.

19. The system of claim 14, further comprising a refinement module to determine a next set of results for presentation in the multi-directional visual browser display based on a navigation input.

20. A machine-readable storage medium in communication with at least one processor, the machine-readable storage medium storing instructions which, when executed by the at least one processor, provides operations comprising:
    determining a primary result and peripheral results, the primary result being based on a search criteria and the peripheral results being related to the primary result based on attributes associated with the primary result and the peripheral results;
    generating a display layout that positions the primary result in a predetermined location of a multi-directional visual browser display and positions the peripheral results in proximity to the primary result based on the attributes, the peripheral results being positioned in a plurality of navigational directions from the predetermined location, each navigational direction corresponding to a respective attribute associated with the peripheral results; and rendering, using one or more processors, the display layout on the device to provide the multi-directional visual browser display.

* * * * *

UNITED STATES PATENT AND TRADEMARK OFFICE
CERTIFICATE OF CORRECTION

| | |
|---|---|
| PATENT NO. | : 8,352,869 B2 |
| APPLICATION NO. | : 12/712167 |
| DATED | : January 8, 2013 |
| INVENTOR(S) | : Melcher et al. |

Page 1 of 1

It is certified that error appears in the above-identified patent and that said Letters Patent is hereby corrected as shown below:

On the Title Page

On page 2, in column 2, under "Other Publications", line 7, delete "12/712,163" and insert --12/712,163,--, therefor On page 2, in column 2, under "Other Publications", line 7, delete "Allowance, Mailed" and insert --Allowance mailed--, therefor In the Claims In column 15, line 54, in Claim 9, delete "thither" and insert --further--, therefor Signed and Sealed this
Eighteenth Day of November, 2014

Michelle K. Lee
*Deputy Director of the United States Patent and Trademark Office*